United States Patent
Gardner et al.

(10) Patent No.: US 9,070,143 B2
(45) Date of Patent: Jun. 30, 2015

(54) SYSTEM AND METHOD FOR TRACKING CONTENT THROUGH THE INTERNET

(71) Applicant: Analyze Software, Inc., San Diego, CA (US)

(72) Inventors: Gary Trent Gardner, San Marcos, CA (US); Ata Hassan, Jr., San Diego, CA (US); Ram Babu Chintala, San Diego, CA (US); Anil Srinivas Guntur, San Diego, CA (US)

(73) Assignee: VENDIGI, INC., San Diego, CA (US)

( * ) Notice: Subject to any disclaimer, the term of this patent is extended or adjusted under 35 U.S.C. 154(b) by 31 days.

(21) Appl. No.: 13/942,636

(22) Filed: Jul. 15, 2013

(65) Prior Publication Data

US 2014/0114749 A1    Apr. 24, 2014

Related U.S. Application Data (63) Continuation of application No. 13/655,299, filed on Oct. 18, 2012, now Pat. No. 8,521,589.

(51) Int. Cl.
*G06Q 30/00*    (2012.01)
*G06Q 30/02*    (2012.01)

(52) U.S. Cl.
CPC ........ *G06Q 30/0273* (2013.01); *G06Q 30/0255* (2013.01); *G06Q 30/0246* (2013.01); *G06Q 30/0269* (2013.01); *G06Q 30/02* (2013.01)

(58) Field of Classification Search
CPC .............................................. G06Q 30/0246
USPC ...................................................... 705/14.45
See application file for complete search history.

(56) References Cited

U.S. PATENT DOCUMENTS

| | | | |
|---|---|---|---|
| 5,584,025 A | 12/1996 | Keithley et al. | 395/615 |
| 6,253,208 B1 | 6/2001 | Wittgreffe et al. | 707/104 |
| 6,594,633 B1 | 7/2003 | Broerman | 705/1 |
| 6,636,803 B1 | 10/2003 | Hartz, Jr. et al. | 701/208 |
| 7,506,359 B1 | 3/2009 | Ling | 726/2 |
| 7,685,229 B1 | 3/2010 | George et al. | 709/203 |
| 8,521,589 B1 | 8/2013 | Gardner et al. | 705/14.45 |
| 2004/0138943 A1 | 7/2004 | Silvernail | 705/10 |
| 2006/0020518 A1 | 1/2006 | Lovison et al. | 705/26 |
| 2007/0100644 A1 | 5/2007 | Keillor et al. | 705/1 |
| 2008/0119167 A1 | 5/2008 | Rao | 455/411 |
| 2009/0019061 A1 | 1/2009 | Scannell, Jr. | 707/10 |
| 2009/0024404 A1 | 1/2009 | Morley et al. | 705/1 |
| 2011/0106616 A1 | 5/2011 | Bigby et al. | 705/14.49 |
| 2011/0251967 A1 | 10/2011 | Klivington et al. | 705/313 |
| 2012/0089597 A1 | 4/2012 | Visioli et al. | 707/722 |
| 2013/0198040 A1 | 8/2013 | Minard | 705/26.61 |
| 2013/0325623 A1 | 12/2013 | Balduf et al. | 705/14.66 |
| 2013/0346848 A1 | 12/2013 | Gardner et al. | 715/234 |

*Primary Examiner* — John G Weiss
*Assistant Examiner* — Scott C Anderson
(74) *Attorney, Agent, or Firm* — Pillsbury Winthrop Shaw Pittman LLP (57) ABSTRACT

Server systems and methods to provide targeted advertising use tracking of digital content. The digital content may include real estate content. Responsive to digital content being presented on a client computing platform, information related to browsing activity on the client computing platform is gathered. Digital content (and/or attributes thereof) are associated with either individual ones of the (real estate) search servers through which the digital content is presented, or individual ones of the content providers of the pertinent digital content, or both. Content providers of digital content are compensated based on revenue that is generated through processing and/or analysis of the associations between users and the digital content that has been presented to them.

19 Claims, 3 Drawing Sheets

SYSTEM AND METHOD FOR TRACKING CONTENT THROUGH THE INTERNET

FIELD

The disclosure relates to systems and methods for providing and/or enabling targeted advertising and, in particular, advertising based on information gathered by virtue of the browsing activity of users pertaining to viewed web pages, including web pages that include real estate content.

BACKGROUND

Accessing web pages and/or servers that present web pages via the internet is known. Presenting information as images is known. Web pages may include content presented by real estate search servers. Servers may serve web pages regarding real estate content. Presenting information to client computing platforms is known. Organizing such information in digital media files, such as web pages, is known. Content providers providing digital media files, and/or the information contained therein, is known. Such content providers may include listing agents. Using a browser software application to present a web page on a client computing platform is known. Hosting sets of digital media files, for example organized in a database, through a media host server is known. A server, e.g. a real estate search server, accessing a media host server to present a digital media file to a client computing platform is known.

SUMMARY

One aspect of the disclosure relates to systems configured to provide targeted advertising. The system may facilitate communication between content providers, media host servers, search servers, ad servers, client computing platforms, demand-side platforms, and/or other entities. The system and/or components related to the system may pertain to real estate and/or real estate content. As used herein, the term "real estate content" includes real estate listing(s), information pertaining thereto, and/or digital content related to real estate. The system and/or any entities that communicate with the system may be deployed using a public network and/or using commercial web services.

Client computing platforms may include one or more processors configured to execute computer program modules. The computer program modules may be configured to enable a user associated with a client computing platform to interact with the system, any component thereof, other client computing platforms, and/or provide other functionality attributed herein to client computing platforms. By way of non-limiting example, client computing platforms may include one or more of a desktop computer, a laptop computer, a handheld computer, a NetBook, a Smartphone, a tablet, a mobile computing platform, a gaming console, and/or other computing platforms.

Digital content may be provided by content providers. By way of non-limiting example, in some embodiments, digital content may pertain to real estate content. Real estate content may for example be provided by listing agents, brokers, and/or other parties. Digital content may include digital media files containing image data, listing information, property information, and/or other information. Digital media files may include markup language files, such as HTML, XHTML, XML, and/or other markup language files, and/or multimedia platform content, such as Adobe™ Flash™, and/or multimedia platform content. The image data may for example include jpg-images, png-images, gif-images, mp4 video, and/or other formats for still images, animated images, other graphics/animations, and/or video images. By virtue of the disclosed technology, the providers of digital content may share (advertising and/or sales) revenue as appropriate, e.g. through a pay-per-viewing model, and/or be otherwise compensated.

The digital media files may be implemented as and/or included in one or more web pages. A web page is a document or information resource, e.g. in the form of an electronic file. As used herein, information presented through a mobile application (or app) is included in the term web page. Web pages may be rendered, interpreted, and/or displayed for presentation on a computing platform, such as a client computing platform. As used herein, displaying information through a mobile application (or app) is included in the term presentation. Presentation of web pages may be supported through a display, screen, or monitor of the computing platform. Web pages may be accessible from a local computing platform (e.g. not connected to the internet) and/or hosted by a remote web server (e.g. connected to the internet and/or one or more other networks). Web pages may be accessed through a browser software application being executed on a computing platform. As used herein, mobile applications such as apps are included in the term browser software application. Web pages may be static, e.g. stored using electronic storage that is accessible by a web server, dynamic, e.g. constructed when requested, and/or a combination of both. The browser software application may be configured to render, interpret, and/or display one or more web pages for presentation on a computing platform. The digital content included in a web page may have been provided by one or more content providers. A set of linked and/or organized web pages may form a website.

A website may include a set of related and/or linked web pages hosted on one or more web servers and accessible via a network, e.g. the internet. Websites and/or web pages may be accessible through an address called a uniform resource locator (URL). Servers may include search servers, media host servers, ad servers, demand-side platforms, and/or other servers.

A search server may host a website that that allows users to interact and/or engage with (searchable) information. User may interact through user interfaces that are displayed and/or presented on client computing platforms. For example, a real estate search server may allow a user to interact and/or engage with a set or database of real estate content. Users may use a real estate search server to search, e.g. by entering a web search query, for real estate content that matches certain criteria, for example location, zip code, school district, property style, average household income in the neighborhood, available views from the property, size, price, price range, a particular listing agent, views associated with the property, and/or other listing information, property information, and/or area-specific (demographic) information. Information related to entered queries may be processed, analyzed, recorded, packaged, offered for sale, exchanged, and/or sold. In response to a web search query from a particular user through a particular client computing platform, a search server may provide access to and/or present one or more digital media files, e.g. through one or more web pages. The one or more web pages may be presented (or displayed for presentation) to the particular user by a browser software application that is being run or executed on the particular client computing platform.

A media host server may host a website that provides storage for, management of, organization of, and/or access to electronic files, e.g. digital media files such as web pages, and/or content particles of such digital media files. The media host server may include an online real estate listing service that provides access to digital media files pertaining to real estate content. Alternatively, and/or simultaneously, the media host server may be associated with content providers that provide access to digital media files. For example, the content providers may include brokerage firms and/or other people and entities that may be related to or interested in real estate and/or real estate content, as well as intermediaries and/or associates of such people and entities that provide access to digital media files pertaining to real estate content.

Online entities may be able to provide electronic files to a media host server such that the media host server may provide access to those electronic files at a future time. For example, one or more listing agents may provide digital media files pertaining to real estate content to a media host server, which in turn may be accessed by one or more real estate search servers, e.g. in response to searches and/or queries from users as described above in relation to real estate search servers. Real estate search servers may locally store copies of the digital media files that are managed and/or organized by a media host server, and/or locally store links, such as URLs, to digital media files that are managed and/or organized by a media host server. In some embodiments, content particles of digital media files are hosted by the media host server and not hosted by other servers such as real estate search servers, such that access to these content particles may be tracked regardless of which server hosts the related digital media files.

An ad server may host and/or provide digital content, usually of a commercial nature and usually to other servers, to be presented for display on client computing platforms. The presentation of digital content may occur in conjunction with the presentation of one or more digital media files and/or web pages. The digital content may include one or more of advertisements, coupons, offers, sales information, branding information, and/or other information of a commercial nature. These types of information of a commercial nature may jointly be referred to as "ads" or "advertisements" throughout this disclosure.

For example, a particular server may be provided with digital content that includes advertisements. The particular server may host a website. A website may include a plurality of web pages. Hosting the website may include transmitting copies of files (e.g., HTML files, XML files, and/or other files) that facilitate assembly and presentation of the web pages on devices remote from the server (e.g., a client computing platform associated with a user). By way of non-limiting example, the hosted website may include one or more of a real estate website, a news portal, a social media website, and/or any other website. The hosted website may present digital content that includes advertisements targeted at different groups of users. In other words, different users may be presented with different digital content and/or different advertisements. The groups of users may be differentiated by one or more of demographic characteristics, geographic characteristics, stated interests, determined and/or expected interests, prior browsing activity, search history, and/or other ways to differentiate users. This list is exemplary and not intended to be limiting in any way. For example, the groups of users may be differentiated based on a particular geographic area that the users are based in, interested in, and/or have a relation with in any other manner. The advertisements provided to such a group of users may be targeted to the particular geographic area.

It is noted that even though groups of users may be differentiated based on information from a particular type, category, and/or industry, e.g. based on information gather from searches performed or real estate content viewed on/through a real estate search website, the advertisements provided to such a group need not be limited to real estate-related advertisements. Note that the website hosted by the particular server that serves such advertisements may be unrelated to real estate. The providers of digital content, e.g. pertaining to real estate content, may share revenue from ads targeted by virtue of the gathered information about users. The information may be gathered by virtue of the users viewing the digital content from the content providers, or having been presented with the digital content.

A demand-side platform may be configured to provide a market, auction-house, and/or exchange pertaining to advertising. In some embodiments, a demand-side platform provides ad exchange accounts and/or data exchange accounts for advertisers. In some embodiments, a demand-side platform enables (real-time) bidding for displaying online ads. In some embodiments, a demand-side platform may issue and/or transmit a request for and/or invitation to acquire information. The information may pertain to particular users and/or user identifiers that identify particular users. In some embodiments, the request may be for a set of user identifiers that correspond to users that satisfy one or more criteria. The criteria may include one or more of demographic criteria, usage criteria, device criteria, and/or other criteria. Demographic criteria may include statistical characteristics of the users themselves. Usage criteria may include information about usage by the users of one or more websites, applications, platforms, and/or other systems. For example, a non-limiting example of usage criteria may correspond to users that have been presented with digital content pertaining to specified criteria. In some embodiments, the presented digital content pertains to real estate content, for example real estate content that meets one or more specified criteria. By way of non-limiting example, the specified criteria for real estate content may be based on attributes of the real estate and/or the real estate content presented in the listings including one or more of geographic area, property value, and/or other attributes.

The system may include a server that communicates with, by way of non-limiting example, one or more of a media host server, one or more (real estate) search servers, one or more client computing platforms that are associated with one or more users, and/or other entities described herein. Individual users may interact, e.g. through browser software applications being executed on client computing platforms, with one or more servers. For example, users may interact with real estate search servers to search for information pertaining to real estate content. A search server may access the media host server to access and/or retrieve one or more pertinent digital media files that are relevant to one or more particular web search queries. The one or more pertinent digital media files may then be presented for display to the one or more users in responsive to entered web search queries. When a digital media file is presented for display, the browser software application may engage a marker that is embedded within the digital media file. Alternatively, and/or simultaneously, when a digital media file is presented for display, the browser software application may engage a content particle identifier that identifies a content particle of a digital media file. Responsive to such an engagement, the server may receive one or more transmissions that indicate occurrences of specific digital media files being presented for display. The server may thus track the use and/or presentation of digital media files, e.g. digital media files pertaining to real estate content.

The server may include one or more processors configured to execute computer program modules. The computer program modules configured to track digital content on the internet, particularly digital media files pertaining to real estate content, may include a correlation module, a service module, a tracking module, a transmission module, a report module, an analytics module, a marker module, a request module, a criteria module, and/or other modules.

The request module may be configured to obtain a request for information. In some embodiments, the request may be obtained from a demand-side platform. The requested information may include a request for a set of user identifiers that correspond to particular users. The particular users may be selected to meet one or more requested criteria. In some embodiments, the requested user identifiers may correspond to users that have been presented with particular digital content. The particular digital content may include real estate content. The requested criteria may pertain to the real estate content. For example, the requested criteria may include a threshold or range for the property value of the real estate content that has been presented to the users. For example, the request criteria may include a geographic area for the real estate content that has been presented to the users. Multiple criteria may be logically combined for a request.

The correlation module may be configured to store information. The stored information may include correlations between markers and digital media identifiers such that individual ones of the markers are correlated with individual ones of the digital media identifiers. Alternatively, and/or simultaneously, the correlation module may be configured to store information that includes records of web pages viewed by individual users and/or user identifiers. As used herein, the phrases "viewed by a user," "having been presented to a user," and "having been presented to a user identifier," as well as obvious derivatives thereof, may be used interchangeably to indicate a presentation of some sort on a client computer platform. Individual records for individual users and/or user identifiers may include attributes of the presented and/or viewed digital content. The presented and/or viewed digital content may pertain to real estate content. In some embodiments, the correlation module may be configured to gather information that includes records of web pages viewed through embedded markers within individual ones of the presented and/or viewed web pages.

Alternatively, and/or simultaneously, the correlation module may be configured to store correlations between digital media files and content particles and/or content particle identifiers. Digital media identifiers identify one or more digital media files. A digital media identifier may include a file name, a property identifier, an encryption and/or hash code, and/or other information that may be used to identify one or more digital media files.

Content particle identifiers identify one or more content particles. A content particle identifier may include a file name, a property identifier, and/or other information that may be used to identify one or more content particles, client computer platforms, users, and/or digital media files. A content particle may be related to and/or a part of a digital media file, such as one or more images, a portion of text, and/or a key or code used to encode and/or encrypt all or part of a digital media file. For example, a content particle may include all or some of the images of a digital media file. In some embodiments, a client computing platform (e.g. through a browser software application being executed thereon) may be unable to present all or some of a digital media file without the related content particle. In some embodiments, a digital media file may be presentable without the related content particle, but at least some information (e.g. important information related to a real estate listing) that is related to and/or included in the digital media file may not be presentable in a meaningful manner until and/or unless the related content particle is available to the client computing platform.

The digital media files may pertain, for example, to real estate content, as described above. The digital media files and/or the content particles may be hosted by a media host server, and/or by one or more other servers. The digital media files may be accessible to users and/or client computing platforms for presentation through (real estate search) servers that have access to a media host server and/or other through one or more other servers. For example, In some embodiments, the functional roles of a media host server and a real estate search server as described may be combined and/or shared by one or more servers. In some embodiments, a correlation between a digital media identifier and a marker may be explicit, for example by including the digital media identifier in the marker. Alternatively, and/or simultaneously, the correlation may be indirect, for example by encoding or encrypting the digital media identifier and including the result in a marker.

Markers may be embedded within digital media files. Individual ones of the markers may be embedded within individual ones of the digital media files, and/or multiple digital media files. Client computing platforms may engage markers and/or content particle identifiers during presentation of digital media files on the client computing platforms. Engaging a marker may include one of more of rendering and/or displaying image data (for example retrieved and/or requested from a remote server), resolving an embedded link, executing an embedded script, and/or other ways to engage a marker. Engaging a content particle identifier may include one of more of rendering and/or displaying image data (for example retrieved and/or requested from a remote server), resolving an embedded link, and/or other ways to engage a content particle identifier. Engaging a marker and/or a content particle identifier may be performed by a browser software application being executed on a client computing platform, e.g. in conjunction with displaying one or more digital media files for presentation. Image data of a marker and/or a content particle identified by a content particle identifier may for example include (links to) jpg-images, png-images, gif-images, mp4 video, and/or other formats for still images, animated images, other graphics/animations, and/or video images. In some embodiments, markers may be embedded by the marker module and/or under control of the marker module, described elsewhere herein.

The service module may be configured to receive transmissions from client computing platforms. The client computing platforms may transmit the transmissions when displaying digital media files and engaging markers embedded within the digital media files. The received transmissions may indicate occurrences of digital media files being presented on client computing platforms. Individual ones of the received transmissions may indicate an individual occurrence of, e.g., one or more digital media files being presented on an individual client computing platform. For example, a client computing platform may present one or more digital media files in response to a web search query being entered in a user interface of a real estate search server. The one or more digital media files may be hosted by a media host server and/or other server that may be accessed, through a network such as the internet, by the real estate search server. In some embodiments, digital media files may be hosted by the real estate search server, which may obviate the need to retrieve the digital media files from another server.

Receipt of transmissions from client computing platforms may be responsive to browser software applications engaging markers and/or content particle identifiers, while being executed on client computing platforms, during presentations of digital media files in which the markers are embedded. Received transmissions may include content particle identifiers, digital media identifiers, information related to browsing activity on the client computing platforms from which the transmission are received, and/or other information. The digital media identifiers may have been included in the digital media files, the markers, or otherwise combined with received transmissions. Individual received transmissions may include individual digital media identifiers that identify one or more particular digital media files.

Information related to browsing activity, as may be included in an individual transmission received by the service module, may include one or more of a domain identifier that identifies an individual real estate search server (particularly the real estate search server through which the one or more particular digital media files were accessed for presentation to one or more client computing platforms), additional content information based on digital content being presented in conjunction with the presentation of one or more digital media files, and/or other information related to browsing activity. A domain identifier may also be referred to as a server identifier. The additional content information may be of a commercial nature, and may pertain to ads.

The tracking module may be configured to determine which digital media files have been presented on client computing platforms, the determination being based on the transmissions received by the service module and/or other information. Alternatively, and/or simultaneously, the tracking module may be configured to determine which real estate search server provided access to the presented digital media files, the determination being based on the transmissions received by the service module and/or other information. In particular, the tracking module may be configured to associate occurrences of digital media files being presented on one or more client computing platforms with the domain identifiers and/or content particle identifiers included in transmissions received by the service module. Such associations may be responsive to receipt of one or more transmissions by the service module. Individual ones of the occurrences of a digital media file being presented on one or more client computing platforms may be associated, by the tracking module, with individual domain identifiers included in individual received transmissions. In some embodiments, determinations by the tracking module may be based on correlations stored by the correlation module. For example, received transmissions may include information based on particular markers that may be correlated with particular digital media identifiers. The particular markers may have been embedded in digital media files that are identified by the particular digital media identifiers.

The transmission module may be configured to transmit digital information and/or initiate communication with client computing platforms and/or servers. The digital information may include content particles of digital media files, image data and/or cookies, and/or other tracking information. The transmission module may operate in response to requests from, e.g., client computing platforms and/or a demand-side platform. In some embodiments, a particular client computing platform may request image data from the server, which may subsequently be transmitted, by the transmission module, to the particular requesting client computing platform. The digital information and/or tracking information transmitted by the transmission module may be used to track browsing activity on client computing platforms. In some embodiments, the transmission module may be configured to communicate a set of user identifiers, for example in response to a request from a demand-side platform.

The report module may be configured to aggregate occurrences of digital media files being presented through (real estate) search servers, for example per individual (real estate) search server. The report module may be configured to combine information from transmissions received by the service module with associations made by the tracking module and/or correlations stored by the correlation module. Results by the report module may be combined in reports, bills, messages, information presented for display, and/or other ways to combine and/or present results.

The report module may be configured to determine, based on information from other modules, a fair compensation for the providers of digital content. For example, the report module may be configured to determine compensation for the providers of digital content pertaining to real estate content, e.g. through a pay-per-listing model. The report module may be configured to determine compensations per domain, per domain identifier, per real estate search server, per legal entity or business associated with any of these, per content provider, and/or any combination or aggregation thereof. The report module may be configured to determine compensation for providers of digital content that meets specified criteria. For example, the determined compensation may be for a set of content providers of real estate content that has been presented to a particular set of users. The particular set of users may correspond to the determined set of user identifiers as described elsewhere herein, in relation to the operation of the criteria module.

The report module may be configured to produce bills, invoices, payments, and/or other financial documents and/or messages to initiate the collection of payments and/or the disbursement of payments based on the determined compensations.

The analytics module may be configured to determine relations, e.g. statistical relations, of information pertaining to and/or within digital media files with information pertaining to particular users and/or client computing platforms. Alternatively, and/or simultaneously, the analytics module may be configured to determine relations, e.g. statistical relations, of particular ads with information from other modules. For example, the analytics module may use data mining techniques to determine the level of interest a particular user (e.g. being associated with a particular client computing platform) appears to have in a particular item of real estate, the efficacy and/or performance of particular ads or particular types of ads presented in conjunction with one or more digital media files (e.g. ads that have some specific characteristic in common), and/or make other determinations that pertain to the use of real estate search servers, browsing activity, real estate content, and/or related digital media files.

The marker module may be configured to embed markers in digital media files and/or assist and/or control the process of embedding markers in digital media files. In some embodiments, content providers that originate and/or provide digital media files, such as e.g. listing agents, may communicate with a media host server through the marker module. For example, the marker module may be configured to generate a user interface that content providers can use to upload digital media files to a media host server. A host server may provide storage for, management of, organization of, and/or access to the uploaded digital media files. During the process of uploading digital media files, the marker module may embed markers within the digital media files, as described elsewhere herein. In some embodiments, the marker module may be configured to communicate with a media host server. Communication may occur in response to a request, instruction, and/or command from a content provider, e.g. to embed markers within digital media files that have been previously uploaded and/or provided to the media host server. In such implementations, the marker module may not be directly involved in uploading and/or providing the digital media files originally to the media host server. In some embodiments, the marker module may be configured to communicate with (real estate search) servers to embed markers within digital media files that have been previously uploaded and/or provided to the media host server. Other implementations, as well as combinations of multiple implementations, are envisioned for the marker module.

The criteria module may be configured to determine a set of user identifiers. Determinations by the criteria module may be performed responsive to a request for a particular set of user identifiers. The request may include one of more specified criteria. In some embodiments, the request for user identifiers corresponds to individual users that have viewed particular digital content. For example, the particular digital content may pertain to real estate content that meets the one or more specified criteria. It is noted that the users, the real estate content, the real estate, or any combination thereof may be subject to one or more specified criteria.

In some embodiments, the criteria module is configured to access stored information that includes records of viewed and/or presented web pages for individual user identifiers and/or groups of user identifiers.

One aspect of the disclosure relates to methods for providing targeted advertising on the internet.

These and other objects, features, and characteristics of the servers, systems and/or methods disclosed herein, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of any limits. As used in the specification and in the claims, the singular form of "a", "an", and "the" include plural referents unless the context clearly dictates otherwise. As used in the specification and in the claims, in a list of items that includes the separator "and/or", combinations of those items, insofar as practically possible, are envisioned as embodiments.

DETAILED DESCRIPTION

Figure 1:
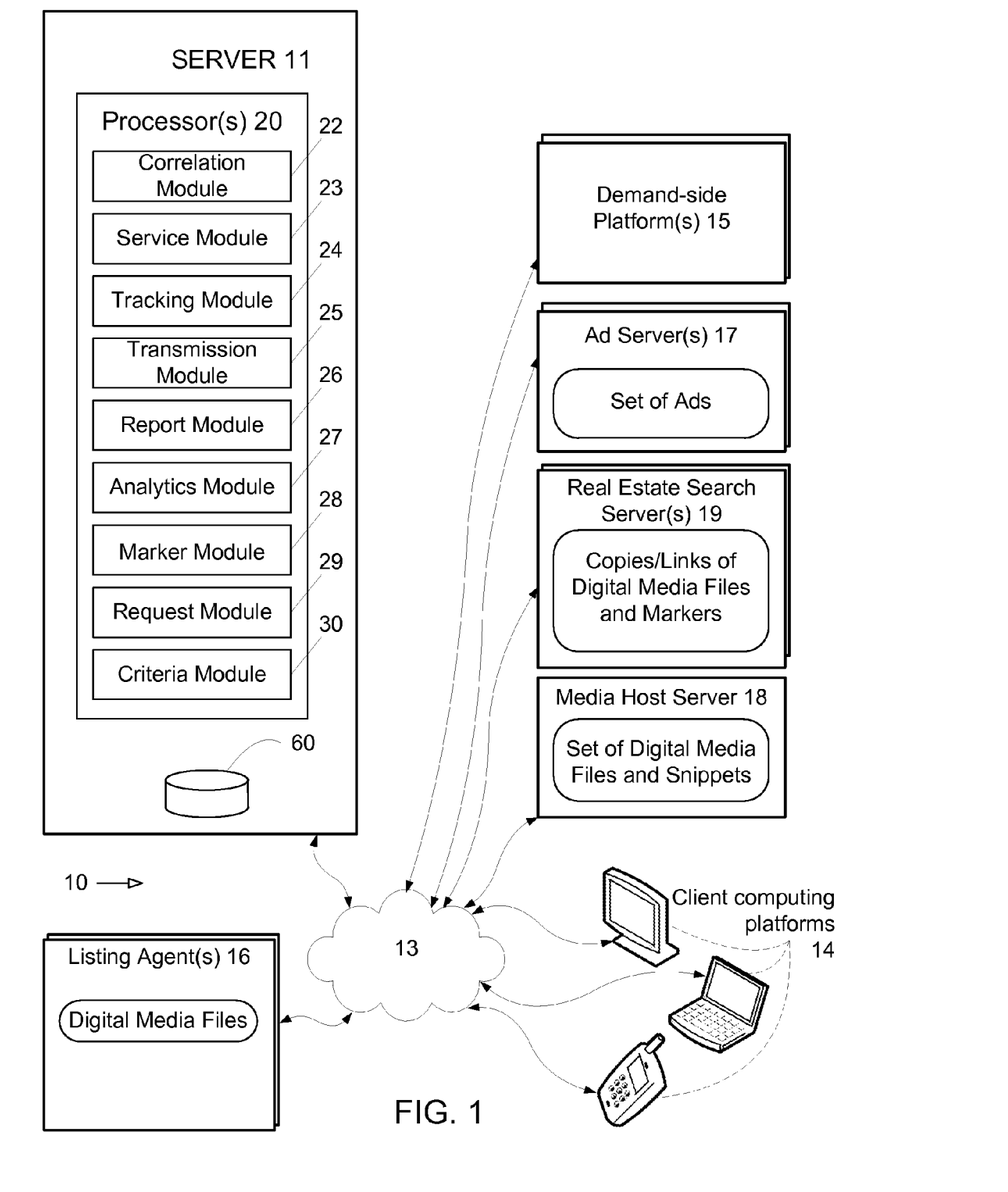
FIG. 1 illustrates a system configured to provide targeted advertising in accordance with one or more implementations.

FIG. 1 illustrates a system 10 configured to provide targeted advertising on the internet. System 10 may facilitate communication between content providers, media host servers, multiple listing services, search servers, ad servers, demand-side platforms, client computing platforms, and/or other people and/or entities. Content providers may include, by way of non-limiting example, listing agents, prospective real estate sellers, real estate agents, real estate brokers, real estate sales people, real estate agencies, brokerage firms (collectively referred to as listing agents), and/or other providers of digital content. The search servers may include real estate search servers. The users of the search servers may include, by way of non-limiting example, prospective real estate buyers, buyer agencies, buyer brokerages, and/or other user/consumers of digital content. For example, system 10 may facilitate communication between people and entities that may be related to or interested in real estate and/or real estate content, as well as intermediaries and/or associates of such people and entities. By virtue of the tracking mechanisms disclosed herein, the content providers of digital content may share in the (advertising and/or sales) revenue as appropriate, and/or be otherwise compensated. Payment models may include a pay-per-listing model, a pay-per-view model, and/or other models.

In some embodiments, one or more components of system 10 may be the same as or similar to system components described in either U.S. patent application Ser. No. 13/530,467 or Ser. No. 13/626,419, filed Jun. 22, 2012 and Sep. 25, 2012, respectively, and both entitled "REAL ESTATE CONTENT TRACKING ON THE INTERNET", which are hereby incorporated by reference in its entirety into the present disclosure. These applications may be referred to as "the '467 application" and "the '419 application" herein.

Digital content, for example digital media files containing image data, listing information, property information, and/or other information, may be presented for display to users on client computing platforms associated with those users. Individual users may request and/or view one or more digital media files through a website that is hosted by a server, in particular a search server. The website, its web pages, and/or the digital media files included therein, may be accessed through browser software applications being executed on client computing platforms.

The presented digital media files may be hosted by, copied from, and/or linked to a media host server that provides storage for, management of, organization of, and/or access to the digital media files, and/or content particles of such digital media files. By way of non-limiting example, media host server may be a server associated with a multiple listing service, e.g. a multiple listing service for a particular geographical area. The media host server may manage a database and/or set of digital media files, e.g. pertaining to real estate within the particular geographical area. Digital media files pertaining to a particular real estate listing or to particular real estate content may have been provided to media host server by a prospective real estate seller, an associated listing agent, and/or another appropriate party representing an interest in a transaction involving the particular item of real estate. By virtue of the content tracking mechanism described herein, a server may establish, among other information, which digital media files have been presented, optionally in conjunction with which (types of) ads, through which real estate search server, and/or to which users.

Referring to FIG. 1, system 10 may include one or more client computing platforms 14, one or more listing agents 16, one or more demand-side platforms 15, one or more ad servers 17, one or more (real estate) search servers 19, a media host server 18, electronic storage 60, a server 11, one or more processors 20, and/or other components. The components in FIG. 1 may be communicatively coupled through one or more networks 13, including but not limited to the Internet. Server 11 may interchangeably be referred to as server system 11 throughout this disclosure. One or more of the processors 20, electronic storage 60, and/or other components may be included in server 11.

One or more processors 20 may be configured to execute computer program modules. The computer program modules may include a correlation module 22, a service module 23, a tracking module 24, a transmission module 25, a report module 26, an analytics module 27, a marker module 28, a request module 29, a criteria module 30, and/or other modules.

In some embodiments, content particles of digital media files may be hosted by media host server 18 while the remainder of the digital media files (or the digital media files that are related to the content particles) may be hosted at any server. During presentation of the remainder of the digital media files (or the digital media files that are related to the content particles), the browser software application being executed on a particular client computing platform 14 engages a content particle identifier that identifies a particular content particle. Note that all or some of the presentation may not be presentable without the particular content particle. Responsive to this engagement, the browser application software may establish a connection to media host server 18 to retrieve the particular content particle that is identified by the engaged content particle identifier, and/or otherwise cause a transmission to media host server 18. Responsive to receipt of such a transmission by service module 23, transmission module 25 may transmit the particular content particle to the particular client computing platform. Responsive to the transmission by transmission module 25, the browser software application may receive and use the particular content particle, e.g. a fragment of a photograph, to present the digital media file including any part that was previously not presentable for lack of the particular content particle.

Request module 29 may be configured to obtain a request for information. In some embodiments, the request may be obtained from demand-side platform 15. The requested information may include a request for a set of user identifiers that correspond to particular users. The particular users may be selected to meet one or more requested criteria. In some embodiments, the requested user identifiers may correspond to users that have been presented with particular digital content. The particular digital content may include real estate content. The requested criteria may pertain to the real estate content and/or any type of listing information, property information, and/or area-specific (demographic) information including, but not limited to, the information used as criteria for queries on real estate search servers. For example, the requested criteria may include a threshold or range for the property value of the real estate that has been presented to the users. For example, the request criteria may include a geographic area for the real estate content that has been presented to the users. Multiple criteria may be logically combined for a request. In some embodiments, request module 29 may be integrated within an online real estate listing service, multiple listing services, real estate search server, search server, $3^{rd}$ party server operating independently from listing server(s) and/or search server(s), and/or other entities as described herein.

Correlation module 22 may be configured to store information. The stored information may include correlations between markers and digital media identifiers, for example such that individual ones of the markers are correlated with individual ones of the digital media identifiers. Alternatively, and/or simultaneously, correlation module 22 may be configured to store information that includes records of web pages viewed for individual users and/or user identifiers. Individual records for individual users and/or user identifiers may include attributes of the presented and/or viewed digital content. The presented and/or viewed digital content may pertain to real estate content. The attributes may pertain to the real estate content and/or the real estate. In some embodiments, correlation module 22 may be configured to gather information that includes records of web pages viewed through embedded markers within individual ones of the presented and/or viewed web pages.

Alternatively, and/or simultaneously, correlation module 22 may be configured to store correlations between digital media files and content particles and/or content particle identifiers. Digital media identifiers may identify one or more digital media files. A digital media identifier may include a file name, a property identifier, an encryption and/or hash function based on information related to a digital media file, and/or other information that may be used to identify one or more digital media files. Content particle identifiers identify one or more content particles. A content particle identifier may include a file name, a property identifier, and/or other information that may be used to identify one or more content particles, one or more client computer platforms 14, users, and/or digital media files. A content particle may be related to and/or a part of a digital media file, such as an image, a portion of text, and/or a key or code used to encode and/or encrypt all or part of a digital media file. In some embodiments, client computing platform 14 (e.g. through a browser software application being executed thereon) may be unable to present all or some of a digital media file without the related content particle. In some embodiments, a digital media file may be presentable without the related content particle, but at least some information (e.g. important information related to an item of real estate, real estate content, and/or the presentation of real estate content) that is related to and/or included in the digital media file may not be presentable in a meaningful manner until and/or unless the related content particle is available to client computing platform 14.

In some embodiments, correlation module 22 may be configured to determine and/or store correlations between web pages that have been presented and the users that have been presented with these pages. Correlation module 22 may be configured to determine and/or store correlations between web pages that have been presented and the digital content included in these presented web pages. In particular the correlations pertaining to the real estate content included in that digital content. Correlation module 22 may be configured to determine (e.g. based on other correlations described herein) and/or store correlations between users and the (real-estate-related) content that has been presented to those users. Once information is stored by correlation module 22, such information may be processed and/or used by other components of system 10. By way of non-limiting example, such information may be used to respond to requests as obtained by request module 29.

The digital media files may pertain, for example, to real estate content, as described above. The digital media files and/or the content particles may be hosted by media host server 18, and/or by one or more other servers. The digital media files may be accessible to users and/or client computing platforms 14 for presentation through real estate search servers 19 that have access to media host server 18 and/or other through one or more other servers. For example, In some embodiments, the functional roles of media host server 18 and one or more of real estate search servers 19 as described may be combined and/or shared by one or more servers. In some embodiments, a correlation between a digital media identifier and a marker may be explicit, for example by including the digital media identifier in the marker. Alternatively, and/or simultaneously, the correlation may be indirect, for example by encoding or encrypting the digital media identifier and including the result in a marker.

Markers may be embedded within digital media files. Individual ones of the markers may be embedded within individual ones of the digital media files, and/or multiple digital media files. Client computing platforms 14 may engage markers and/or content particle identifiers during presentation of digital media files on client computing platforms 14. Engaging a marker may include one of more of rendering and/or displaying image data (for example retrieved and/or requested from a remote server, media host server 18, and/or server 11), resolving an embedded link, executing an embedded script (which may, e.g., transmit information to a remote server, media host server 18, and/or server 11), and/or other ways to engage a marker. Engaging a content particle identifier may include one of more of rendering and/or displaying image data (for example retrieved and/or requested from media host server 18), resolving an embedded link, and/or other ways to engage a content particle identifier. Engaging a marker and/or content particle identifier may be performed by a browser software application being executed on client computing platform 14, e.g. in conjunction with displaying one or more digital media files for presentation. Image data of a marker and/or a content particle identified by a content particle identifier may for example include (links to) jpg-images, png-images, gif-images, mp4 video, and/or other formats for still images, animated images, other graphics/animations, and/or video images. In some embodiments, markers may be embedded by marker module 28 and/or under control of marker module 28, described elsewhere herein.

Service module 23 may be configured to receive transmissions from client computing platforms 14. Transmission received by service module 23 may include requests for (image) information from client computing platforms 14, for example by virtue of an <img> tag in an HTML webpage referring to a source URL within a domain controlled by server 11. For example, the requested image information may include a transparent 1×1 pixel GIF image. Client computing platforms 14 may transmit the transmissions when displaying digital media files and engaging content particle identifiers and/or engaging markers embedded within the digital media files. The received transmissions may indicate and/or imply occurrences of digital media files being presented on client computing platforms 14. Individual ones of the received transmissions may indicate and/or imply an individual occurrence of, e.g., one or more digital media files being presented on an individual client computing platform 14. For example, a client computing platform 14 may present one or more digital media files in response to a web search query being entered in a user interface of real estate search server 19. The one or more digital media files may be hosted by media host server 18 and/or another server that may be accessed, through a network 13 such as the internet, by real estate search server 19. In some embodiments, digital media files may be hosted by real estate search server 19, which may obviate the need to retrieve the digital media files from another server.

Receipt of transmissions from client computing platforms 14 may be responsive to browser software applications engaging markers and/or content particle identifiers, while being executed on client computing platforms 14, during presentations of digital media files, e.g. digital media files in which markers are embedded. Received transmissions may include content particle identifiers, digital media identifiers, information related to browsing activity on client computing platforms 14 from which the transmission are received, and/ or other information. The digital media identifiers may be included in the digital media files, the markers, or otherwise combined with received transmissions. Individual received transmissions may include individual digital media identifiers that identify one or more particular digital media files.

Information related to browsing activity, as may be included in an individual transmission received by service module 23, may include one or more of a domain identifier that identifies an individual real estate search server 19 (particularly the real estate search server 19 through which the one or more particular digital media files were accessed for presentation to one or more client computing platforms 14), additional content information based on digital content being presented in conjunction with the presentation of one or more digital media files, and/or other information related to browsing activity. For example, the information related to browsing activity may include one or more of an IP address or a MAC address of the pertinent client computing platform 14, information about the hardware and/or software configuration of the pertinent client computing platform 14, a cookie from the pertinent client computing platform 14, and/or information (e.g. geographical information) related to an internet service provider (ISP) used by the pertinent client computing platform 14 to access the internet. Information related to browsing activity may include information about which ads have been served and/or clicked on, and/or how much time is spent on a particular webpage and/or particular digital media file, as well as other usage statistics related to browsing activity. The additional content information may be related to content of a commercial nature, e.g. ads. For example, the additional content information may be used to determine which particular ads are presented to a user in conjunction with a particular digital media file. A domain identifier may also be referred to as a server identifier.

Tracking module 24 may be configured to determine which digital media files have been presented on client computing platforms 14, the determination being based on the transmissions received by service module 23 and/or other information. Alternatively, and/or simultaneously, tracking module 24 may be configured to determine which real estate search server 19 provided access to the presented digital media files, the determination being based on the transmissions received by service module 23 and/or other information. In particular, tracking module 24 may be configured to associate occurrences of digital media files being presented on one or more client computing platforms 14 with the domain identifiers included in transmissions received by service module 23. Such associations may be responsive to receipt of one or more transmissions by service module 23. Individual ones of the occurrences of a digital media file being presented on one or more client computing platforms 14 may be associated, by tracking module 24, with individual domain identifiers included in individual received transmissions. In some embodiments, determinations by tracking module 24 may be based on correlations stored by correlation module 22. For example, received transmissions may include information based on particular markers that may be correlated with particular digital media identifiers. The particular markers may have been embedded in digital media files that are identified by the particular digital media identifiers.

Transmission module 25 may be configured to transmit digital information and/or initiate communication with client computing platforms 14, demand-side platforms 15, and/or other components of system 10. The digital information may include image data and/or cookies, and/or other tracking information. Transmission module 25 may operate in response to requests from client computing platforms 14 and/ or a demand-side platform 15. In some embodiments, a particular client computing platform 14 may request image data from server 11, which may subsequently be transmitted, by transmission module 25, to the particular requesting client computing platform 14. The digital information and/or tracking information transmitted by transmission module 25 may be used to track browsing activity on client computing platforms 14. For example, cookies transmitted by transmission module 25 may be used by tracking module 24, report module 26, analytics module 27, and/or other components of server 11. In some embodiments, transmission module 25 may be configured to communicate a set of user identifiers, for example in response to a request from a demand-side platform 15.

Report module 26 may be configured to aggregate occurrences of digital media files and/or ads being presented through (real estate) search servers 19, for example per individual (real estate) search server 19. Report module 26 may be configured to combine information from transmissions received by service module 23 with associations made by the tracking module 24 and/or correlations stored by the correlation module 22. Results by report module 26 may be combined in reports, bills, messages, information presented for display, and/or other ways to combine and/or present results.

Report module 26 may be configured to determine, based on information from other modules, a fair compensation for the providers of digital content. For example, report module 26 may be configured to determine compensation for the providers of digital content pertaining to real estate content. The determination of compensation may be based on one or more compensation models, including but not limited to a pay-per-listing model, a pay-per-view model, and/or combinations thereof.

Report module 26 may be configured to aggregate information about the presentations of digital media files and/or ads pertaining to particular real estate content, for example in one or more reports for the one or more content providers and/or listing agents related to the particular real estate content. Report module 26 may be configured to determine, based on information from other modules, intended financial compensation for the providers of digital content pertaining to real estate content. For example, proper compensation may ensure continued participation and provision of digital real estate content.

Report module 26 may be configured to determine (proposed, suggested, and/or requested) compensations per domain, per domain identifier, per real estate search server, per legal entity or business associated with any of these, per content provider, and/or any combination or aggregation thereof. For example, the determined compensation may be for a set of content providers of real estate content that has been presented to a particular set of users. The compensation may be based on revenue for initiating communication of a determined set of user identifiers in response to a request, as described elsewhere herein. The compensation may be based on the presented digital content that pertains to real estate content that meets one or more specified criteria. The particular set of users may correspond to the determined set of user identifiers as described elsewhere herein, in relation to the operation of criteria module 30.

In some embodiments, a particular user identifier may be included in a determined set of user identifiers by virtue of a subset of the digital content that has been presented to the particular user. The subset of the digital content may have been provided by a plurality of content providers. The determined compensation could take into account exactly how many real estate content per content provider has contributed to the inclusion of the particular user. Alternatively, and/or simultaneously, the determined compensation may involve some or all of the content providers that have contributed digital content in the subset of digital content. Combinations and variations of multiple compensation schemes are contemplated within the scope of this disclosure. It is noted that there may be conceptual friction between a mathematically fair compensation scheme and a pragmatic compensation scheme for a system that limits the amount and/or level of detail for how closely the presentations of digital content can or will be tracked. Assume the particular user viewed real estate content of 50 items of real estate from a dozen content providers, but only 5 items of real estate match the specified criteria in the request. Increasingly complicated compensation schemes may be devised in such a situation.

Report module 26 may be configured to produce bills, invoices, payments, and/or other financial documents and/or messages to initiate the collection of payments and/or the disbursement of payments based on the determined (proposed) compensations. Report module 26 may be configured to produce, generate, and/or transmit financial documents to initiate the distribution of payments based on the determined intended compensations for, e.g., content providers.

Analytics module 27 may be configured to determine relations, e.g. statistical relations, of information pertaining to and/or within digital media files with information pertaining to particular users and/or client computing platforms 14. Alternatively, and/or simultaneously, analytics module 27 may be configured to determine relations, e.g. statistical relations, of particular ads with information from other modules. For example, analytics module 27 may use data mining techniques to determine the level of interest a particular user (e.g. being associated with a particular client computing platform 14) appears to have in a particular (type of) real estate, the efficacy and/or performance of particular ads or particular types of ads presented in conjunction with one or more digital media files (e.g. ads that have some specific characteristic in common), and/or make other determinations that pertain to the use of real estate search servers 19, browsing activity, real estate content, and/or related digital media files.

Marker module 28 may be configured to embed markers in digital media files and/or assist and/or control the process of embedding markers in digital media files. In some embodiments, entities that originate and/or provide digital media files, such as e.g. listing agents, may communicate with media host server 18 through marker module 28. For example, marker module 28 may be configured to generate a user interface that listing agents and/or other online entities can use to upload digital media files to media host server 18 that provides storage for, management of, organization of, and/or access to the uploaded digital media files. During the process of uploading digital media files, marker module 28 may embed markers within the digital media files, for example by inserting a script and/or image in a digital media file such as a webpage. By way of non-limiting example, inserting a transparent 1×1 pixel GIF image in an HTML webpage through an <img> tag may be one implementation of embedding a marker in a digital media file.

In some embodiments, marker module 28 may be configured to communicate with media host server 18, e.g. in response to a request, instruction, and/or command from a listing agent, to embed markers within digital media files that have been previously uploaded and/or provided to media host server 18. In such implementations, marker module 28 may not be directly involved in uploading and/or providing the digital media files originally to media host server 18. In some embodiments, marker module 28 may be configured to communicate with real estate search servers 19 to embed markers within digital media files that have been previously uploaded and/or provided to media host server 18. Other implementations, as well as combinations of multiple implementations, are envisioned for marker module 28.

Criteria module 30 may be configured to determine a set of user identifiers. Determinations by criteria module 30 may be performed responsive to a request for a particular set of user identifiers. The request may include one of more specified criteria, including but not limited to any criteria described herein, such as the criteria used for queries on real estate search servers. In some embodiments, the request for user identifiers corresponds to individual users that have viewed particular digital content. For example, the particular digital content may pertain to real estate content that meets the one or more specified criteria. It is noted that the users, the real estate content, or any combination thereof may be subject to one or more specified criteria. In some embodiments, one or more criteria may be subject to a threshold number of occurrences. For example, a request may specify user identifiers that have been presented with at least 3, 5, 10, and/or another appropriate number of items of real estate content in a particular geographic area and/or a particular property value range on separate occasions. Individual occurrences may filter out if the same property is presented multiple times to the same user.

The requested criteria may include a temporal component. For example, a request may specify that occurrences of presentations need to be at least a predetermined amount of time apart. For example, multiple occurrences may need to span multiple days. The temporal component may operate as a limit or maximum of occurrences for a predetermined time frame, such as a day. In other words, by virtue of using the temporal component in determining a set of user identifiers, criteria module 30 may be configured to distinguish, for example, between a first user who has viewed three items of real estate per day that match the specified criteria, for five consecutive days, and a second user who has viewed fifteen items of real estate that match the specified criteria in a single day.

In some embodiments, criteria module 30 is configured to access stored information that includes records of viewed and/or presented web pages for individual user identifiers and/or groups of user identifiers. Individual records may include attributes of the presented real estate and/or real estate content, e.g. the presented real estate content. Determinations by criteria module 30 may be based on filtering one or more attributes of individual records by one or more specified criteria that are included in the request.

In some embodiments, the process of embedding markers within digital media files may be performed locally by real estate search server 19. For example, a script and/or image may be inserted into a digital media file (e.g. dynamically, i.e. upon a request from a user through a client computing platform) when the pertinent digital media file is presented to the client computing platform associated with the user. Dynamically embedded markers may not only be correlated to one or more digital media identifiers and/or digital media files, but may furthermore include information related to browsing activity on a client computing platform.

One or more processors 20 may be configured to provide information processing capabilities in system 10 and/or server 11. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some embodiments, processor 20 may include a plurality of processing units. These processing units may be physically located within the same device, or processor 20 may represent processing functionality of a plurality of devices operating in coordination (e.g., "in the cloud", and/or other virtualized processing solutions).

It should be appreciated that although modules 22-30, are illustrated in FIG. 1 as being co-located within a single processing unit, in implementations in which processor 20 includes multiple processing units, one or more of modules 22-30 may be located remotely from the other modules. The description of the functionality provided by the different modules 22-30 described herein is for illustrative purposes, and is not intended to be limiting, as any of modules 22-30 may provide more or less functionality than is described. For example, one or more of modules 22-30 may be eliminated, and some or all of its functionality may be provided by other ones of modules 22-30. As another example, processor 20 may be configured to execute one or more additional modules that may perform some or all of the functionality attributed herein to one of modules 22-30.

Electronic storage 60 of system 10 in FIG. 1 may comprise electronic storage media that stores information. The electronic storage media of electronic storage 60 may include one or both of system storage that is provided integrally (i.e., substantially non-removable) with server 11 and/or removable storage that is removably connectable to server 11 via, for example, a port (e.g., a USB port, a FireWire™ port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), network-attached storage (NAS), and/or other electronically readable storage media. Electronic storage 60 may include virtual storage resources, such as storage resources provided via a cloud and/or a virtual private network. Electronic storage 60 may store software algorithms, information determined by processor 20, information received via client computing platforms 14, and/or other information that enable server 11 and system 10 to function properly. Electronic storage 60 may be separate components within system 10, or electronic storage 60 may be provided integrally with one or more other components of system 10 (e.g., processor 20).

Figure 2:
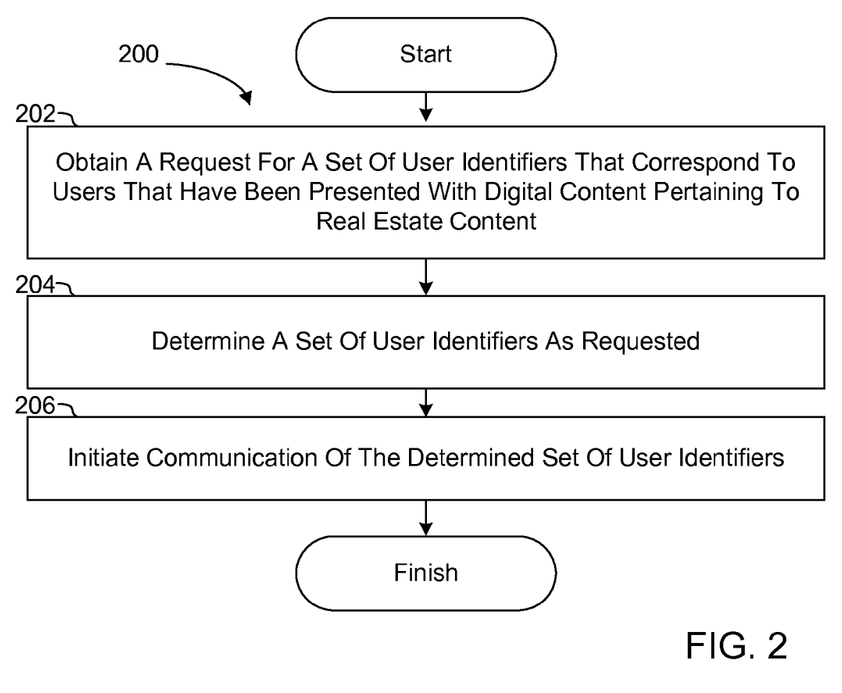
FIG. 2 illustrates a method for providing targeted advertising in accordance with one or more implementations.
Figure 3:
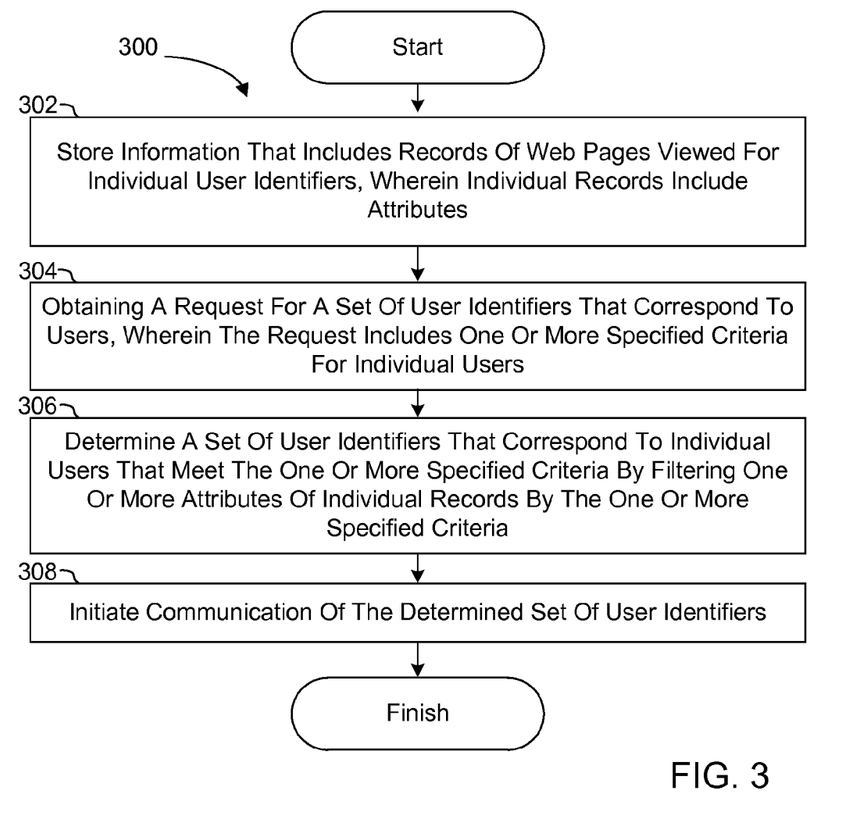
FIG. 3 illustrates a method for providing targeted advertising in accordance with one or more implementations.

FIG. 2 and FIG. 3 illustrate a method 200 and a method 300 for providing targeted advertising on the internet. Regarding method 200, at an operation 202, a request is obtained for a set of user identifiers. The set of user identifiers corresponds to users that have been presented with digital content pertaining to real estate content. The request includes one or more specified criteria for the real estate content. In some embodiments, operation 202 may be performed by a request module that is the same as or similar to request module 29 (shown in FIG. 1 and described herein).

At an operation 204, a set of user identifiers is determined. The determined set of user identifiers corresponds to users that have been presented with digital content pertaining to real estate content that meets one or more specified criteria. In some embodiments, operation 204 may be performed by a criteria module that is the same as or similar to criteria module 30 (shown in FIG. 1 and described herein).

At an operation 206, communication of the determined set of user identifiers is initiated. In some embodiments, operation 206 may be performed by a transmission module that is the same as or similar to transmission module 25 (shown in FIG. 1 and described herein).

Regarding method 300, at an operation 302, information is stored that includes records of web pages that have been presented to individual user identifiers, wherein individual records include attributes. In some embodiments, operation 302 is performed by a correlation module the same as or similar to correlation module 22 (shown in FIG. 1 and described herein).

At an operation 304, a request is obtained for a set of user identifiers that correspond to users, wherein the request includes one or more specified criteria for individual users. In some embodiments, operation 304 is performed by a request module the same as or similar to request module 29 (shown in FIG. 1 and described herein).

At an operation 306, a set of user identifiers is determined that correspond to individual users that meet the one or more specified criteria by filtering one or more attributes of individual records by the one or more specified criteria. In some embodiments, operation 306 is performed by a criteria module the same as or similar to criteria module 30 (shown in FIG. 1 and described herein).

At an operation 308, communication of the determined set of user identifiers is initiated. In some embodiments, operation 308 is performed by a transmission module the same as or similar to transmission module 25 (shown in FIG. 1 and described herein).

At an operation 310, a set of content providers is determined that is associated with digital content pertaining to the presented web pages. In some embodiments, operation 310 is performed by a report module the same as or similar to report module 26 (shown in FIG. 1 and described herein).

At an operation 312, compensation for the set of content providers is determined. Compensation is based on revenue for initiating communication of the determined set of user identifiers in response to the obtained request. In some embodiments, operation 312 is performed by a report module the same as or similar to report module 26 (shown in FIG. 1 and described herein).

The operations of method 200 and method 300 presented herein are intended to be illustrative. In some embodiments, method 200 and/or method 300 may be accomplished with one or more additional operations not described, and/or without one or more of the operations discussed. Additionally, the order in which the operations of method 200 and method 300 are illustrated in FIG. 2 and FIG. 3 and described herein is not intended to be limiting.

In some embodiments, method 200 and/or method 300 may be implemented in one or more processing devices (e.g., a server, a digital processor, an analog processor, a digital circuit designed to process information, an analog circuit designed to process information, a state machine, and/or other mechanisms for electronically processing information). The one or more processing devices may include one or more devices executing some or all of the operations of method 200 and/or method 300 in response to instructions stored electronically on an electronic storage medium. The one or more processing devices may include one or more devices configured through hardware, firmware, and/or software to be specifically designed for execution of one or more of the operations of method 200 and/or method 300.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to provide targeted advertising to users who have been served digital real estate listings and to determine compensation for content providers that provided the digital real estate listings, the system comprising:
   one or more processors configured to execute computer program modules, the computer program modules comprising:
   a correlation module configured to determine correlations between digital real estate listings and user identifiers, wherein the digital real estate listings have been served to users identified by the user identifiers;
   an analytics module configured to determine relations between criteria of the digital real estate listings and the served digital real estate listings;
   a request module configured to obtain, from a demand-side platform, a request for one or more criteria of the digital real estate listings that have been served to an individual user identified by an individual user identifier, wherein the request includes the individual user identifier;
   a criteria module configured to determine one or more criteria of the digital real estate listings that have been served to the individual user identified by the individual user identifier included in the request;
   a transmission module configured to initiate, responsive to obtaining the request, communication of the determined one or more criteria in exchange for revenue from the demand-side platform; and
   a report module configured to determine a set of content providers that provided the digital real estate listings served to the individual user identified by the individual user identifier, wherein the report module is further configured to determine compensation for the set of content providers, wherein the compensation is based on the revenue from the demand-side platform for initiating communication of the determined one or more criteria to the demand-side platform.

2. The system of claim 1, wherein the analytics module is configured to determine the relations such that one or more criteria differentiate between the user identifiers based on at least one of demographic characteristics and geographic characteristics.

3. The system of claim 1, wherein the analytics module is configured to determine the relations such that one or more criteria differentiate between the user identifiers based on one or more of stated interests, determined interests, and/or expected interests.

4. The system of claim 1, wherein the analytics module is configured to determine the relations such that one or more criteria differentiate between the user identifiers based on prior browsing activity.

5. The system of claim 1, wherein the request obtained from the demand-side platform includes a set of user identifiers, and wherein determinations by the criteria module are made for individual ones of the set of user identifiers.

6. The system of claim 1, wherein operation of the analytics module is based on data mining techniques, and wherein the one or more relations include statistical relations.

7. The system of claim 1, wherein the correlation module is configured to determine correlations based on attributes of the served digital real estate listings.

8. The system of claim 1, wherein the transmission module is further configured to receive transmissions, from client computing platforms of the users, of information indicating which users have been served which digital real estate listings, wherein an individual received transmission includes:
  i) an individual user identifier that identifies an individual user, and
  ii) a digital real estate listing identifier that identifies a digital real estate listing served to the individual user;
  wherein determinations by the criteria module are made based on the information received by the transmission module.

9. The system of claim 1, wherein individual user identifiers identify individual users by association with at least one of an IP address, a MAC address, a browser cookie, and information about the hardware and/or software configuration of a client computing platform.

10. A computer-implemented method to provide targeted advertising to users who have been served digital real estate listings and to determine compensation for content providers that provided the digital real estate listings, the method being implemented in a computer system that includes one or more physical processors, the method comprising:
  determining, on the one or more physical processors, correlations between digital real estate listings and user identifiers, wherein the digital real estate listings have been served to users identified by the user identifiers;
  determining relations between criteria of the digital real estate listings and the served digital real estate listings;
  obtaining, from a demand-side platform, a request for one or more criteria of the digital real estate listings that have been served to an individual user identified by an individual user identifier, wherein the request includes the individual user identifier;
  determining one or more criteria of the digital real estate listings that have been served to the individual user identified by the individual user identifier included in the request;
  initiating communication of the determined one or more criteria to the demand-side platform in exchange for revenue from the demand-side platform;
  determining a set of content providers that provided the digital real estate listings served to the individual user identified by the individual user identifier; and
  determining compensation for the set of content providers, wherein the compensation is based on the revenue from the demand-side platform for initiating communication of the determined one or more criteria to the demand-side platform.

11. The method of claim 10, wherein determining relations is performed such that one or more criteria differentiate between the user identifiers based on at least one of demographic characteristics and geographic characteristics.

12. The method of claim 10, wherein determining relations is performed such that one or more criteria differentiate between the user identifiers based on at least one of stated interests, determined interests, and expected interests.

13. The method of claim 10, wherein determining relations is performed such that one or more criteria differentiate between the user identifiers based on prior browsing activity.

14. The method of claim 10, wherein the request obtained from the demand-side platform includes a set of user identifiers, and wherein the step of determining the one or more criteria is performed for individual ones of the set of user identifiers.

15. The method of claim 10, wherein determining the one or more relations is based on data mining techniques, and wherein the one or more relations include statistical relations.

16. The method of claim 10, wherein determining correlations is based on attributes of the served digital real estate listings.

17. The method of claim 10, further comprising:
  receiving transmissions, from client computing platforms of the users, of information indicating which users have been served which digital real estate listings, wherein an individual received transmission includes:
    i) an individual user identifier that identifies an individual user, and
    ii) a digital real estate listing identifier that identifies a digital real estate listing served to the individual user;
  wherein determining the one or more criteria is based on the received information.

18. The method of claim 10, wherein individual user identifiers identify individual users by association with at least one of an IP address, a MAC address, a browser cookie, and/or information about the hardware and software configuration of a client computing platform.

19. A system configured to provide targeted advertising to users who have been served digital real estate listings and to determine compensation for content providers that provided the digital real estate listings, the system comprising:
  one or more processors configured to execute computer program modules, the computer program modules comprising:
  a correlation module configured to determine correlations between digital real estate listings and user identifiers, wherein the digital real estate listings have been served to users identified by the user identifiers;
  an analytics module configured to determine relations between criteria of the digital real estate listings and the served digital real estate listings, wherein the criteria of the digital real estate listings include price range;
  a request module configured to obtain, from a demand-side platform, a request for one or more criteria of the digital real estate listings that have been served to a set of multiple users identified by a set of user identifiers, wherein the request includes the set of user identifiers;
  a criteria module configured to determine one or more criteria of the digital real estate listings that have been served to individual ones of the set of multiple users identified by individual ones of the set of user identifiers;
  a transmission module configured to initiate, responsive to obtaining the request, communication of the determined one or more criteria in exchange for revenue from the demand-side platform; and
  a report module configured to determine a set of content providers that provided the digital real estate listings served to the set of multiple users, wherein the report module is further configured to determine compensation for the set of content providers, wherein the compensation is based on the revenue from the demand-side platform for initiating communication of the determined one or more criteria to the demand-side platform.

* * * * *